(12) United States Patent  
Johns (10) Patent No.: US 11,902,241 B2  
(45) Date of Patent: Feb. 13, 2024

(54) HOSTNAME PRE-LOCALIZATION

(71) Applicant: Level 3 Communications, LLC, Broomfield, CO (US)

(72) Inventor: Kevin Johns, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 243 days.

(21) Appl. No.: 17/131,852

(22) Filed: Dec. 23, 2020

(65) Prior Publication Data

US 2021/0281542 A1 Sep. 9, 2021

Related U.S. Application Data

(60) Provisional application No. 62/985,050, filed on Mar. 4, 2020.

(51) Int. Cl.
```
G06F 15/16      (2006.01)
H04L 61/30      (2022.01)
H04L 67/1097    (2022.01)
H04L 101/69     (2022.01)
```
(52) U.S. Cl.  
CPC .......... *H04L 61/30* (2013.01); *H04L 67/1097* (2013.01); *H04L 2101/69* (2022.05)

(58) Field of Classification Search  
CPC .... H04L 67/1097; H04L 61/30; H04L 61/609  
See application file for complete search history.

(56) References Cited

U.S. PATENT DOCUMENTS

| | | | |
|---|---|---|---|
| 8,819,187 B1 | 8/2014 | Hofmann | |
| 10,541,974 B2* | 1/2020 | Lakritz | G06F 40/58 |
| 10,735,528 B1* | 8/2020 | Shafiullah | H04L 65/1066 |
| 10,742,521 B2* | 8/2020 | Varney | H04L 67/32 |
| 2015/0046591 A1 | 2/2015 | Zhu | |
| 2015/0289203 A1 | 10/2015 | Zhang | |

OTHER PUBLICATIONS

International Search Report and Written Opinion of the International Searching Authority, dated Sep. 10, 2021, Int'l Appl. No. PCT/US21/018385, Int'l Filing Date Feb. 17, 2021, 8 pgs.  
Canadian Examination Report, dated Nov. 3, 2023, Application No. 3,168,502, filed Feb. 17, 2021; 3 pgs.

* cited by examiner

*Primary Examiner* — Yves Dalencourt (57) ABSTRACT

Examples of the present disclosure relate to hostname pre-localization. In examples, a service uses a content distribution network (CDN) to provide at least a part of the computing functionality associated with the service. A pre-localized hostname may be used to direct the client computing device to a specific edge server of the CDN that is associated with the computing functionality. In examples, a service receives an initiation request from a client computing device for the computing functionality provided by the CDN. The service generates a pre-localization request comprising pre-localization information and provides the pre-localization request to the CDN. Accordingly, the CDN generates a pre-localized hostname associated with an edge server based on the pre-localization information. The pre-localized hostname is provided to the service, which is then provided to the client computing device, thereby directing the client computing device to the specific edge server of the CDN.

18 Claims, 7 Drawing Sheets

HOSTNAME PRE-LOCALIZATION

BACKGROUND

A hostname of a content distribution network (CDN) is resolved to an Internet Protocol (IP) address for an edge server of the CDN, thereby enabling a client computing device to access content from the edge server. However, limited information is available when resolving the hostname, which may result in the selection of a suboptimal edge server as compared to other servers within the CDN. For example, the selected edge server may not have the content that was requested, such that the edge server may need to first cache or otherwise access the requested content before fulfilling the request.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure relate to hostname pre-localization. In examples, a service uses a content distribution network (CDN) to provide at least a part of the computing functionality associated with the service. Accordingly, the service provides a hostname associated with the CDN to direct a client computing device to the CDN for such functionality. A pre-localized hostname may be used to direct the client computing device to a specific edge server of the CDN that is associated with the computing functionality, as compared to more generally directing the client computing device to the CDN as a whole (e.g., after which DNS-based localization techniques may be used to identify a proximate data center with which to process requests).

In examples, a service receives an initiation request from a client computing device for computing functionality that is provided by the CDN. As a result, the service generates a pre-localization request comprising pre-localization information and provides the pre-localization request to the CDN. Accordingly, the CDN generates a pre-localized hostname associated with an edge server of the CDN based on the pre-localization information. The pre-localized hostname is provided to the service, which is then provided to the client computing device in response to the initiation request, thereby directing the client computing device to the specific edge server of the CDN.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A content distribution network (CDN) comprises a set of edge servers used to process requests from client computing devices. In examples, one or more edge servers form part of a data center, wherein data centers of the CDN may be geographically dispersed to service client computing devices within one or more geographic regions. For example, a data center comprises multiple edge servers in a common geographic location, such that demand from client computing devices is distributed among the edge servers of the data center. In order to direct client requests from a client computing device to a specific edge server within a data center, an authoritative Domain Name System (DNS) server associated with the CDN resolves a hostname of the CDN to an Internet Protocol (IP) address associated with the specific edge server. In some examples, the specific edge server is selected based at least in part on a geographic location associated with the requesting client computing device and/or according to round-robin techniques for selecting an edge server within a data center (a process referred to herein as "localization"). The client computing device then communicates with the specific edge server to send requests, receive responses, and/or to access content, among other examples.

However, due to the limited information that is provided as part of a DNS resolution request to resolve a hostname of the CDN, it may be difficult to identify an edge server that is well-suited to process a request from a client computing device. For example, edge servers within a data center may each be assigned one or more responsibilities (e.g., handling different types of requests, handling a specific subset of content, etc.), such that resolving a DNS resolution request based on a hostname (and, in some examples, a location) yields an IP address for an edge server that is not well-suited to handle requests from a client computing device, whereas a different edge server of the data center (or a different data center) may instead be assigned such responsibilities and may therefore be a better selection.

For example, if a selected edge server is not responsible for content that is requested by a client computing device, the edge server may first cache the content from another server (e.g., another edge server within the data center, an edge server from a different data center, an origin server, etc.) in order to fulfill the content request. This may result in poor utilization of available computing resources within the CDN, as resources that could otherwise be available to serve client computing devices are instead used to transfer the requested content to the edge server (even though another edge server within the data center may already have or, in other examples, at least be responsible for the requested content).

Accordingly, aspects of the present disclosure relate to hostname pre-localization. In examples, a CDN is used by a service to process requests of client computing devices associated with users of the service. Any of a variety of services may use a CDN according to aspects described herein. Example services include, but are not limited to, a video streaming service, a video game service, a cloud-computing service, or a web application service. For example, a video streaming service may use the CDN to provide streaming content, thereby offloading at least a part of the computational demand associated with providing the video streaming service to the CDN. When the service receives an initiation request for content from a client computing device (e.g., as a result of a user of the client computing device initiating video streaming from the service), the service provides a pre-localization request to the CDN, which comprises pre-localization information that indicates the requested content.

The pre-localization information is used by the CDN to determine a hostname associated with an edge server that is responsible for the requested content, thereby reducing the likelihood that the requested content must be first cached from another server within the CDN. A pre-localization response indicating the determined pre-localization hostname is provided to the service. As a result, the service generates a response to the client computing device that directs the client computing device to the determined edge server using the hostname, thereby causing the client computing device to communicate with the determined edge server to access the content. Thus, "pre-localization" (and the resulting "pre-localized" hostname) is used as an alternative to or in addition to localization that may be performed by a DNS server in order to identify an edge server of the CDN to process requests from a client computing device.

As used herein, an initiation request is a request received by a service from a client computing device, in response to which the service directs the client computing device to a CDN. In examples, a service is distinct from a CDN (e.g., of which the service is a customer), wherein the service comprises one or more server computing devices that are utilized by a client computing device in addition to edge servers/data centers of the CDN. As an example, one or more server computing devices of the service may be used to provide a website that is accessed by the client computing device, after which an initiation request causes the client computing device to be directed to the CDN rather than server computing devices of the service (e.g., based on a pre-localized hostname according to aspects described herein).

Returning to the example of a video streaming service, the video streaming service may receive an initiation request from a client computing device after receiving an indication that a user has selected "play" or selected a video from a catalog of videos offered by the video streaming service. In some examples, the initiation request comprises such an indication. In examples, the video streaming service may be a customer of a CDN that is responsible for serving content provided by the video streaming service. Accordingly, the video streaming service may provide a response to the initiation request, which directs the client computing device to access the content from the CDN. As another example, an initiation request may be received by a video game service when a player selects a game mode within a video game, such that the video game service directs a computing device of the player to the CDN to play the selected game mode using a server of the CDN. Thus, it will be appreciated that an initiation request may be associated with any of a variety of computing functionality for which a service uses a CDN, including, but not limited to, providing content (e.g., one or more files, video and/or audio streams, etc.), server-side processing (e.g., online gaming, cloud computing, web applications, etc.), and audio/video conferencing, among other examples.

A service may generate a pre-localization request and provide the pre-localization request to the CDN in order to obtain a pre-localized hostname. The pre-localization request comprises pre-localization information, which may comprise information about the client computing device, including, but not limited to, an IP address, a geographic location, software and/or hardware capabilities (e.g., one or more supported codecs, whether hardware decoding is available, etc.), and/or a device type (e.g., tablet, laptop, mobile device, etc.). As another example, pre-localization information may comprise information relating to an initiation request, including, but not limited to, information regarding associated computing functionality (e.g., requested content, one or more databases associated with server-side processing, etc.), an indication of the service with which the initiation request is associated, a uniform resource locator (URL) of the request, and/or information regarding related client computing devices (e.g., as may be the case in a video game and/or teleconferencing scenario). Pre-localization information may be generated based on an initiation request received from a client, based on information generated by a service, or any combination thereof, among other examples.

A pre-localization request may be communicated via an application programming interface (API). As an example, the CDN may provide a web interface according to the representational state transfer (REST) software architecture, wherein pre-localization information is received as part of a pre-localization request via the API and a pre-localized hostname is provided in response. It will be appreciated that any of a variety of other techniques may be used to communicate pre-localization information and an associated pre-localized hostname.

In examples, the generation of a pre-localized hostname is deterministic, such that providing at least the same subset of pre-localization information yields the same pre-localized hostname. For example, a hashing algorithm is used to hash requested content indicated by pre-localization information and identify an edge server within a data center that is responsible for the requested content. In such examples, a hash table may be used to associate hashed requested content values with one or more edge servers accordingly.

The hash table may be associated with a specific data center, such that a hash table is determined according to proximity of the specific data center to a location of a client computing device (e.g., as may be indicated by the pre-localization information). It will be appreciated that similar techniques may be used to generate a pre-localized hostname based on additional or alternative pre-localization information. Further, alternative techniques may be used in addition to or as an alternative to identifying an edge server based on a hash and an associated hash table. For example, a lookup table associating computing functionality and one or more hostnames may be used. Further, it will be appreciated that multiple edge servers may be associated with a determined hostname (e.g., either within the same data center and/or among multiple data centers).

In some examples, the pre-localization determination may be performed by a service rather than via an API provided by a CDN, such that the service itself implements techniques described herein for generating the pre-localized hostname. In such examples, edge server information and/or an algorithm associated with determining a pre-localized hostname may be provided to the service and, in some examples, periodically updated. As another example, a client computing device may use an API provided by a CDN rather than a service, such that the client computing device requests a pre-localized hostname via the API accordingly. The client computing device receives a pre-localized hostname in response, and may then resolve the pre-localized hostname to an IP address of a particular edge server accordingly.

In other examples, a service need not provide a pre-localized hostname to a client computing device and may instead direct the client computing device to the CDN using a hostname that is more broadly associated with the CDN (e.g., such that the hostname may be localized according to the DNS resolution techniques discussed above). Ultimately, the client computing device may communicate with an edge server of the CDN. The edge server may perform aspects similar to the pre-localization techniques described herein in response to a request received from the client computing device, thereby redirecting the client computing device to a different edge server using a pre-localized hostname.

Figure 1:
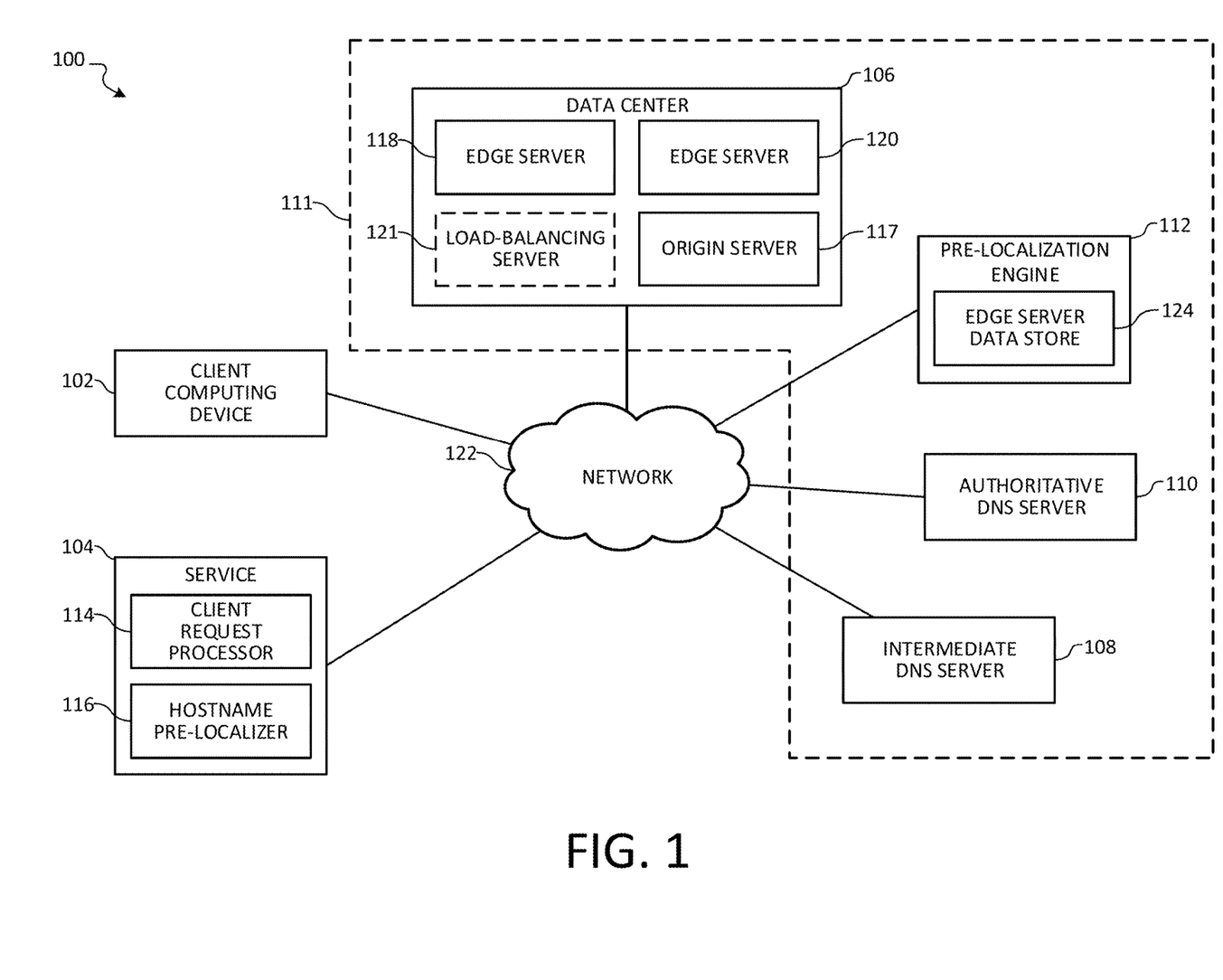
FIG. 1 illustrates an overview of an example system in which aspects of hostname pre-localization may be practiced.

FIG. 1 illustrates an overview of an example system 100 in which aspects of hostname pre-localization may be practiced. As illustrated, system 100 comprises client computing device 102, service 104, data center 106, intermediate DNS server 108, authoritative DNS server 110, pre-localization engine 112, and network 122. Client computing device 102, service 104, data center 106, intermediate DNS server 108, authoritative DNS server 110, and pre-localization engine 112 are illustrated communicating through network 122. Network 122 may comprise a local area network, a wide area network, one or more cellular networks, and/or the Internet, among other examples.

Client computing device 102 may be any of a variety of computing devices, including, but not limited to, a mobile computing device, a tablet computing device, a laptop computing device, or a desktop computing device. In examples, client computing device 102 communicates with service 104. Service 104 may be any of a variety of services, including, but not limited to, a video streaming service, a video game service, a cloud-computing service, or a web application service, among other examples. Service 104 may use a CDN to provide at least a part of the computing functionality utilized by client computing device 102. For example, service 104 may host a website with which the client computing device 104 interacts to view available content; however, when the client computing device 102 sends a request for particular content hosted for the service 104 by the CDN, the client is directed to the CDN to obtain the content. As illustrated, data center 106, intermediate DNS server 108, authoritative DNS server 110, and/or pre-localization engine 112 may form at least a part of such a CDN, as illustrated by dashed box 111. It will be appreciated that, in other examples, certain elements of the example CDN described with respect to system 100 may be provided by a third party (e.g., intermediate DNS server 108, data center 106, etc.). Further, functionality described herein with respect to specific elements may be distributed according to any of a variety of other techniques. For example, pre-localization engine 112 may instead be part of data center 106.

Data center 106 is illustrated as comprising origin server 117, edge servers 118 and 120, and load-balancing server 121. In other examples, origin server 117 may be operated by a third party and/or may be located in a different data center communicatively coupled to data center 106. Origin server 117 and edge servers 118 and 120 provide computing functionality of the CDN according to aspects described herein. In examples, edge servers 118 and 120 each have a set of associated responsibilities within data center 106. For example, service 104 may have a catalog of content for which data center 106 is responsible, such that edge server 118 is responsible for a first subset of content and edge server 120 is responsible for a second subset of content. Origin server 117 may store the catalog of content, such that edge servers 118 and 120 cache content from their respective subset of content from origin server 117 in order to provide such content to client computing device 102. In examples, the first subset and the second subset may be mutually exclusive, such that there is no overlap between the subsets. In other examples, at least a part of the first subset and the second subset may overlap. It will be appreciated that multiple data centers may be used. For example, data centers of the CDN may be geographically distributed in order to improve latency between edge servers and client computing devices.

In examples, client request processor 114 of service 104 processes requests received from client computing device 102. Client request processor 114 may direct client computing device 102 to a hostname associated with the CDN (e.g., associated with one of edge servers 118 or 120), for example in response to an initiation request. As a result, client computing device 102 communicates with intermediate DNS server 108 to resolve the hostname to an IP address of one of edge servers 118 and 120. Intermediate DNS server 108 communicates with authoritative DNS server 110 to determine an IP address for the hostname, which intermediate DNS server 108 provides to client computing device 102. In examples, authoritative DNS server 110 localizes DNS requests as described above. For example, authoritative DNS server 110 may determine a location associated with a DNS resolution request (e.g., of client computing device 102 or intermediate DNS server 108, etc.) and may return an IP address of an edge server 118 or 120 based at least in part on the determined location. In examples, however, assignment by authoritative DNS server 110 of a particular edge server 118 or 120 may be random and/or blind with respect to the content actually stored on, or services provided by, such edge servers 118 and 120. In other examples, authoritative DNS server 110 may return an IP address of a load-balancing server 121 (illustrated using a dashed box to indicate that, in some examples, load-balancing server 121 may be omitted) for the data center 106, which may then assign a particular edge server 118 or 120 to process the request. Again, however, such assignment of a particular edge server 118 or 120 to process the request may be random and/or blind with respect to the content actually stored on, or services provided by, such edge servers 118 and 120.

Client computing device 102 uses the IP address to communicate with edge server 118 or 120 accordingly. It will be appreciated that while system 100 is described with respect to one origin server 117, two edge servers 118 and 120, one client computing device 102, one intermediate DNS server 108, and one authoritative DNS server 110, any number of such elements may be used in other examples. For example, client computing device 102 may communicate directly with authoritative DNS server 110 or, as another example, multiple intermediate DNS servers may be used to ultimately resolve an IP address for a given hostname.

In examples, a hostname provided to client computing device 102 by service 104 may be pre-localized in order to direct client computing device 102 to a particularly well-suited one of edge servers 118 and 120 (e.g., prior to, or without, localization by authoritative DNS server 110). Service 104 is illustrated as further comprising hostname pre-localizer 116. Hostname pre-localizer 116 communicates with pre-localization engine 112 to determine a pre-localized hostname, which is then provided to client computing device 102 via client request processor 114. As an example, hostname pre-localizer 116 generates a pre-localization request comprising pre-localization information and provides the pre-localization request to pre-localization engine 112. In examples, client request processor 114 provides information relating to a received initiation request, at least a part of which may be used to generate the pre-localization information. For example, the pre-localization information may comprise information about client computing device 102 and/or information relating to the received initiation request. The pre-localization request may be provided to pre-localization engine 112 using an API according to aspects described herein.

Pre-localization engine 112 receives pre-localization requests and provides pre-localized hostnames in response. Pre-localization engine 112 is illustrated as comprising edge server data store 124, in which information relating to edge servers of the CDN may be stored. Example edge server information includes, but is not limited to, one or more associated responsibilities, current or projected utilization of computing resources, a geographic location, and/or one or more services with which the edge server is associated, among other examples. In examples, multiple pre-localization engines are used. For example, pre-localization engines may be geographically distributed and, in some examples, may be collocated with data centers of the CDN. It will be appreciated that edge server data store 124 may comprise a full set of edge server information (e.g., for each edge server within the CDN) or may comprise a subset of edge server information (e.g., for geographically proximate edge servers, for edge servers associated with a specific service, etc.).

Edge server information stored by edge server data store 124 is used by pre-localization engine 112 to determine a pre-localized hostname based on pre-localization information. In examples, pre-localization engine 112 determines a pre-localized hostname according to a deterministic algorithm, such that at least the same subset of pre-localization information yields the same pre-localized hostname.

For example, a hashing algorithm may be used to hash requested content indicated by pre-localization information. In one example, a hash table in edge server data store 124 may associate hashed requested content values with one or more edge servers accordingly. The hash table may be associated with a specific data center, such that a hash table associated with a specific data center is determined according to proximity of the specific data center to a location indicated by the pre-localization information. Accordingly, a hostname of an edge server indicated by the hash table may be provided by pre-localization engine 112 (e.g., to hostname pre-localizer 116) as the pre-localized hostname for the pre-localization information. It will be appreciated that similar techniques may be used to generate a pre-localized hostname based on additional or alternative pre-localization information. For example, the content request may be dynamically hashed across a set of eligible servers (e.g., the edge servers 118 in data center 106) to identify which edge server is responsible and, thus, most likely to have the requested content. Further, other techniques may be used in addition to or as an alternative to hashing pre-localization information. For example, a lookup table associating computing functionality and one or more hostnames may be used. Accordingly, client computing device 102 receives the pre-localized hostname (e.g., via client request processor 114) and resolves the pre-localized hostname via intermediate DNS server 108 and/or authoritative DNS server 110. Client computing device 102 then communicates with the edge server 118 or 120 associated with the pre-localized hostname.

In other examples, client computing device 102 receives a hostname from service 104 that is not pre-localized. The hostname may be resolved to an IP address for one of edge servers 118 or 120, such that client computing device 102 communicates with the edge server (for the sake of example, edge server 118) to access content (or utilize alternative or additional computing functionality of the CDN) accordingly. Edge server 118 may determine whether it is responsible for the requested computing functionality and, if so, may continue communicating with client computing device 102. However, if edge server 118 determines that it is not responsible for the requested computing functionality, edge server 118 may generate a pre-localization request comprising pre-localization information and provide the pre-localization request to pre-localization engine 112. In response, edge server 118 receives a pre-localized hostname for an edge server that is responsible for the computing functionality, such as edge server 120. Edge server 118 then provides the pre-localized hostname to client computing device 102, thereby redirecting client computing device 102 to edge server 120.

Figure 2A:
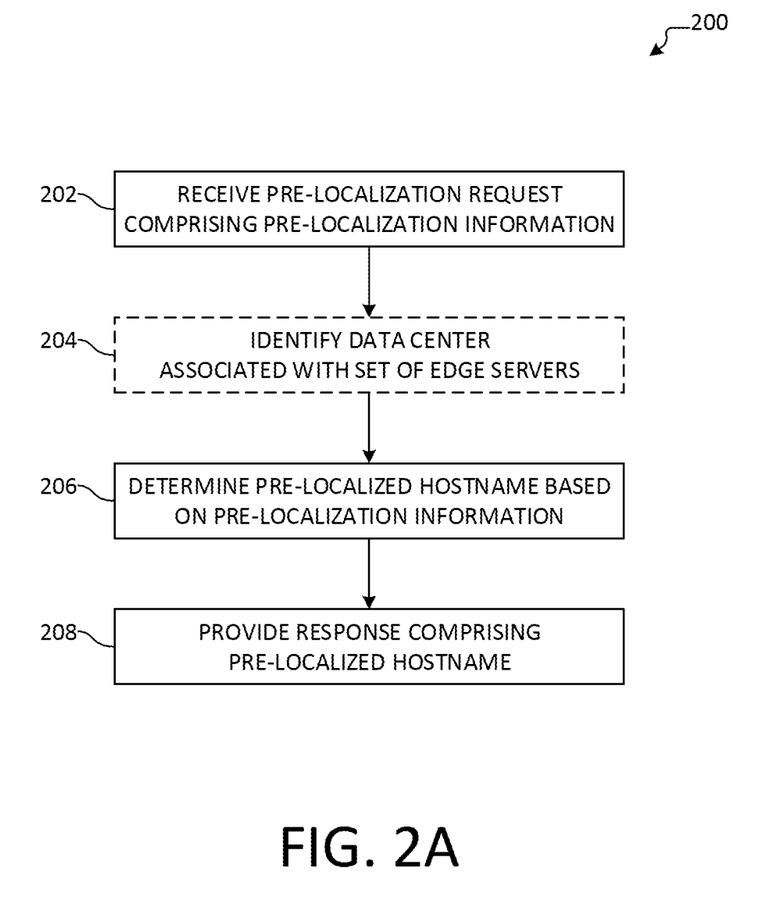
FIG. 2A illustrates an overview of an example method for processing a pre-localization request to perform hostname pre-localization according to aspects described herein.

FIG. 2A illustrates an overview of an example method 200 for processing a pre-localization request to perform hostname pre-localization according to aspects described herein. In examples, aspects of method 200 are performed by a pre-localization engine, such as pre-localization engine 112 in FIG. 1. Method 200 begins at operation 202, where a pre-localization request comprising pre-localization information is received. A pre-localization request may be received from a hostname pre-localizer of a service, such as hostname pre-localizer 116 of service 104 in FIG. 1. In other examples, the pre-localization request is received from an edge server (e.g., in order to redirect a client computing device to another edge server), such as edge server 118 or 120 in FIG. 1. In another example, a pre-localization request may be received from a client computing device, such as client computing device 102 in FIG. 1. In examples, the pre-localization request is received via an API. Thus, it will be appreciated that a pre-localization request may be received from any of a variety of sources using various techniques.

The pre-localization information received in the pre-localization request may comprise information relating to a client computing device and/or an initiation request, among other examples. Example pre-localization information relating to the client computing device includes, but is not limited to, an IP address, a geographic location, software and/or hardware capabilities, and/or a device type. As another example, pre-localization information relating to an initiation request includes, but is not limited to, information regarding content requested, associated computing functionality, an indication of the service with which the initiation request is associated, a URL of the request, and/or information regarding related client computing devices.

Flow progresses to operation 204, where a data center associated with a set of edge servers is identified. In examples, the data center is identified based on information stored by an edge server data store, such as edge server data store 124 in FIG. 1. Operation 204 may comprise evaluating at least a part of the pre-localization information received at operation 202, for example to identify a data center that is proximate to a geographic location indicated by the pre-localization information. As another example, the data center (or at least a subset of edge servers therein) may be determined based on an association with a service that is indicated by the pre-localization information. It will be appreciated that any of a variety of other pre-localization information may be used in addition to or as an alternative to the examples described herein. Operation 204 is illustrated using a dashed box to indicate that, in other examples, operation 204 may be omitted from method 200. For example, a proximate data center may not be identified when generating a pre-localized hostname, such that localization may instead be performed by an authoritative DNS server when a client computing device requests resolution of the pre-localized hostname.

At operation 206, a pre-localized hostname is determined from the identified data center based on the pre-localization information. Aspects of operation 206 may comprise evaluating edge server information, as may be stored by an edge server data store such as edge server data store 124 in FIG. 1. For example, a hashing algorithm may be used to hash requested content indicated by pre-localization information and determine a hostname relating to one or more edge servers that are responsible for the requested content. In such examples, a hash table may be used to associate hashed requested content values with an edge server hostname accordingly. The hash table may be associated with a data center identified in operation 204, in examples where operation 204 is performed. It will be appreciated that similar techniques may be used to generate a pre-localized hostname based on additional or alternative pre-localization information. Further, other techniques may be used in addition to or as an alternative to hashing pre-localization information. For example, a lookup table associating computing functionality and one or more hostnames may be used. Further, it will be appreciated that multiple edge servers may be associated with a determined hostname (e.g., either within the same data center and/or among multiple data centers). In such examples, an edge server may be selected randomly, based on an evaluation of current utilization of computing resources, or as part of hostname localization performed by an authoritative DNS server, among other selection techniques.

Flow progresses to operation 208, where a response is provided comprising the determined pre-localized hostname. In examples, the response is provided to a hostname pre-localizer of a service, such as hostname pre-localizer 116 of service 104 in FIG. 1. In examples where an edge server provided the localization request received in operation 202 to redirect a client computing device, the response may be provided to the edge server, such as edge servers 118 or 120 in FIG. 1. In some examples, the response is provided to a client computing device, such as client computing device 102 in FIG. 1. Flow terminates at operation 208.

Figure 2B:
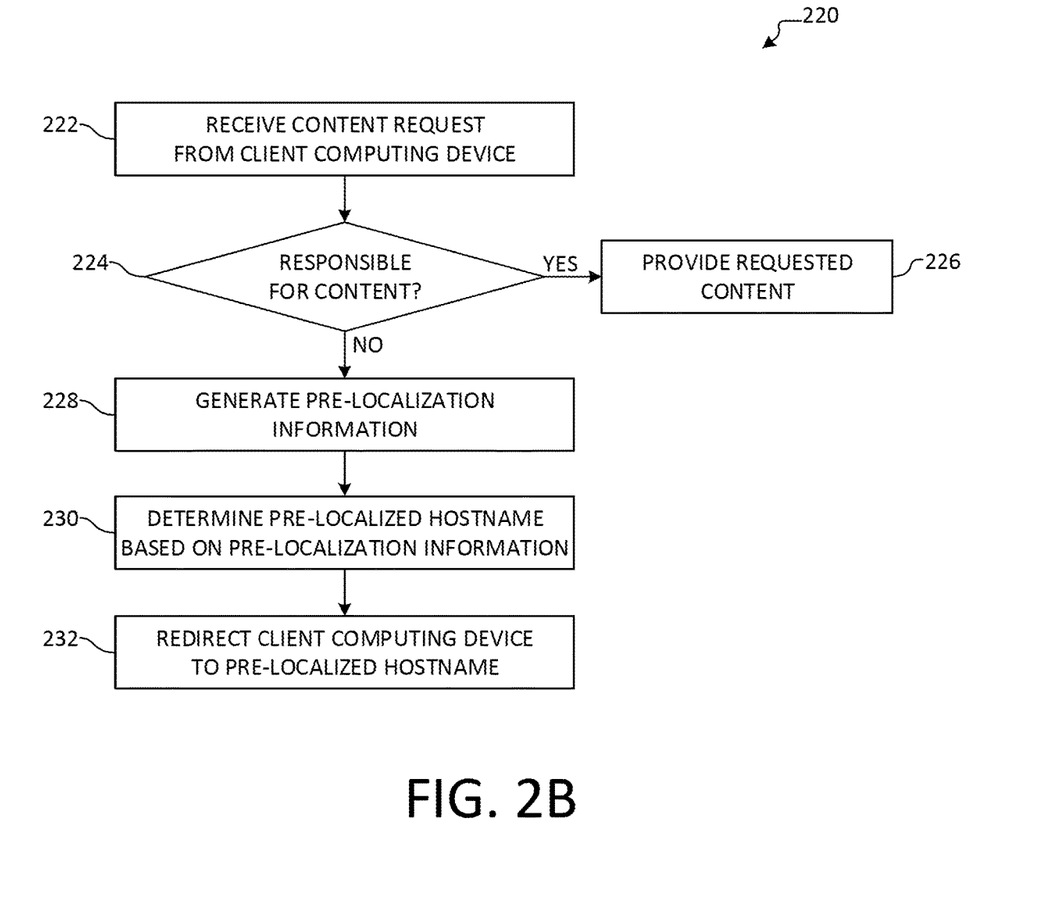
FIG. 2B illustrates an overview of an example method for redirecting a client computing device to a different edge server using hostname pre-localization according to aspects described herein.

FIG. 2B illustrates an overview of an example method 220 for redirecting a client computing device to a different edge server using hostname pre-localization according to aspects described herein. In examples, aspects of method 220 are performed by an edge server, such as edge server 118 or 120 in FIG. 1. Method 220 begins at operation 222, where a content request is received from a client computing device. The content request may be received as a result of a service directing the client computing device to the edge server in response to an initiation request from the client computing device. In some examples, the client computing device may have been directed to the edge server using a pre-localized hostname.

At determination 224, it is determined whether the edge server is responsible for the requested content. In examples, the determination comprises evaluating a set of content that is cached by the edge server or a list of content for which the edge server is responsible, among other examples. Thus, it will be appreciated that the edge server need not necessarily have the requested content immediately available in order to be responsible for the requested content. While method 220 is described as an example in which an edge server is responsible for a subset of content, it will be appreciated that similar techniques may be used for edge servers having any of a variety of additional or alternative computing functionality and associated responsibilities.

If, at determination 224, it is determined that the edge server is responsible for the requested content, flow branches "YES" to operation 226, where the requested content is provided to the client computing device. In examples, providing the requested content comprises accessing the content from a cache of the edge server. In other examples, the requested content may be cached from another edge server or from an origin server, among other examples. Flow terminates at operation 226.

If, however, it is determined that the edge server is not responsible for the requested content, flow instead branches "NO" to operation 228, where pre-localization information is generated. In examples, the pre-localization information is generated based at least in part on the content request that was received at operation 222. For example, the content request may comprise one or more headers, cookies, and/or other information that may be used to generate pre-localization information about the client computing device and/or about requested computing functionality according to aspects described herein.

Moving to operation 230, a pre-localized hostname is determined based on pre-localization information. In examples, the pre-localized hostname is determined by generating a pre-localization request and providing the pre-localization request to a pre-localization engine, such as pre-localization engine 112 in FIG. 1. In other examples, the edge server may perform at least a part of the pre-localization aspects described above with respect to method 200 in FIG. 2A in order to determine a pre-localized hostname based on the pre-localization information.

Flow progresses to operation 232, where the client computing device is redirected to the pre-localized hostname. As an example, the redirect is provided to the client computing device as a hypertext transport protocol (HTTP) 302 response, thereby directing the client computing device to a different URL. As another example, a response is provided to the client computing device that comprises instructions that, when executed by the client computing device, causes the client computing device to be directed to the pre-localized hostname. It will be appreciated that any of a variety of redirection techniques may be used. Flow terminates at operation 232.

Figure 2C:
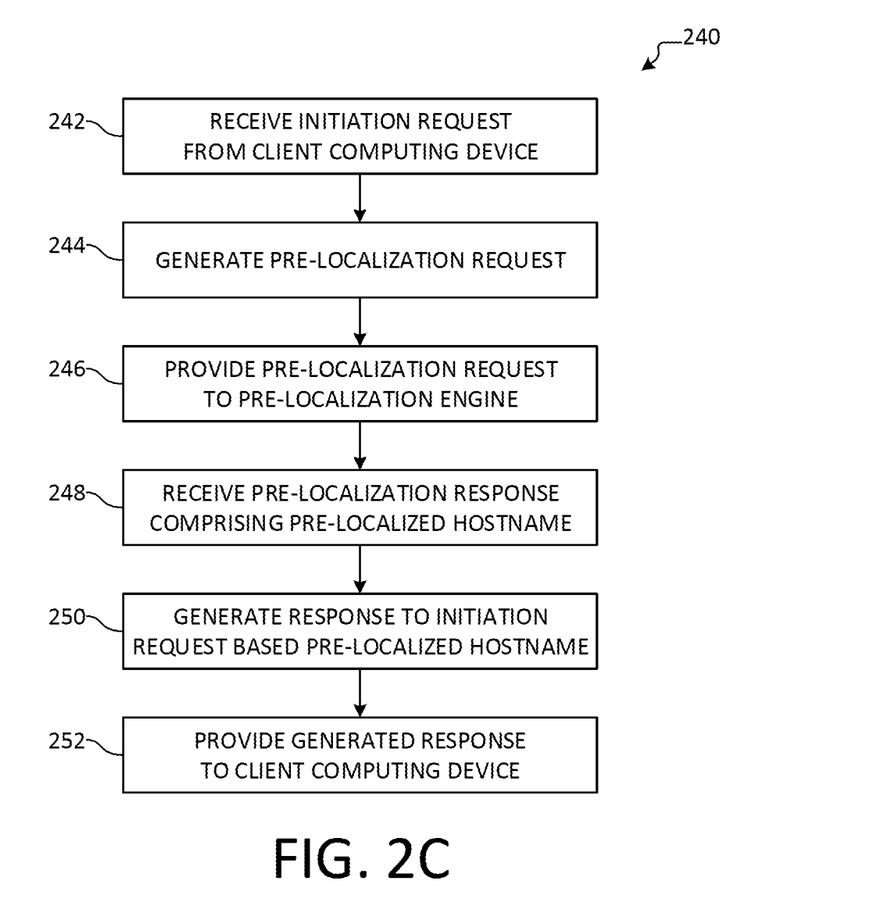
FIG. 2C illustrates an overview of an example method for performing hostname pre-localization by a service according to aspects described herein.

FIG. 2C illustrates an overview of an example method 240 for performing hostname pre-localization by a service according to aspects described herein. In examples, aspects of method 240 are performed by a service, such as service 104 in FIG. 1. Method 240 begins at operation 242, where an initiation request is received from a client computing device (e.g., client computing device 102 in FIG. 1). As described above, the initiation request may be associated with any of a variety of computing functionality for which the service uses a CDN, including, but not limited to, providing content, server-side processing, and audio/video conferencing, among other examples.

At operation 244, a pre-localization request is generated. The pre-localization request comprises pre-localization information. Pre-localization information is generated based at least in part on the initiation request received at operation 242. As described above, pre-localization information may comprise information about the client computing device, including, but not limited to, an IP address, a geographic location, software and/or hardware capabilities, and/or a device type. As another example, pre-localization information may comprise information relating to the initiation request, including, but not limited to, information regarding requested content, associated computing functionality, an indication of the service with which the initiation request is associated, a URL of the request, and/or information regarding related client computing devices.

Flow progresses to operation 246, where the pre-localization request is provided to a pre-localization engine, such as pre-localization engine 112 in FIG. 1. In examples, the pre-localization request is provided to the pre-localization engine using an API. At operation 248, a pre-localization response is received, comprising a pre-localized hostname. In some examples, operations 246 and 248 may be omitted and the service may instead generate the pre-localized hostname based on the pre-localization information and edge server information as described herein.

At operation 250, a response to the initiation request received at operation 242 is generated. The response comprises an indication of the pre-localized hostname, thereby directing the client computing device to the pre-localized hostname associated with the CDN. For example, the response may comprise a list of one or more hostnames from which to access content comprising at least the pre-localized hostname, thereby enabling a media player of the client computing device to access the content using the pre-localized hostname. Flow progresses to operation 252, where the response is provided to the client computing device. Method 240 terminates at operation 252.

Figure 3A:
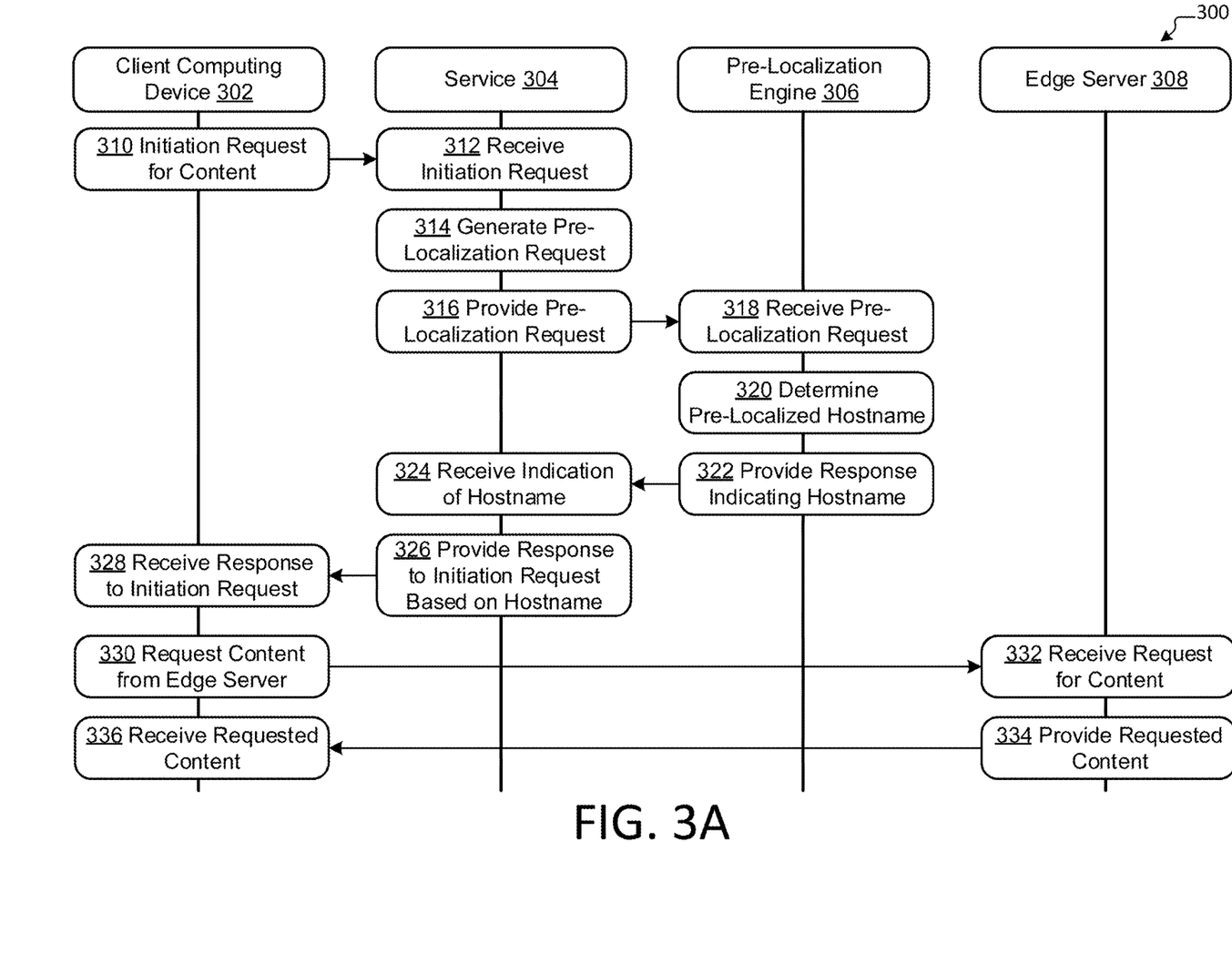
FIG. 3A illustrates an overview of an example method for performing hostname pre-localization in response to an initiation request from a client computing device and processing a content request from the client computing device at an edge server accordingly.

FIG. 3A illustrates an overview of an example method 300 for performing hostname pre-localization in response to an initiation request from a client computing device and processing a content request from the client computing device at an edge server accordingly. FIG. 3A comprises client computing device 302 (e.g., client computing device 102 in FIG. 1), service 304 (e.g., service 104), pre-localization engine 306 (e.g., pre-localization engine 112), and edge server 308 (e.g., edge server 118 or 120).

Method 300 begins at operation 310, where an initiation request for content is transmitted from client computing device 302 to service 304. The initiation request may be a request for computing functionality or content for which service 304 uses a CDN (e.g., where such functionality may be provided by edge server 308). Service 304 receives the initiation request at operation 312. Accordingly, service 304 generates a pre-localization request at operation 314, which is provided to pre-localization engine 306 at operation 316. As described herein, the pre-localization request comprises pre-localization information relating to the initiation request and/or client computing device 302.

Pre-localization engine 306 receives the pre-localization request at operation 318. In examples, the pre-localization request is received from service 304 via an API. Flow progresses to operation 320, where pre-localization engine 306 determines a pre-localized hostname based on the pre-localization information that was received at operation 318. Operation 320 may comprise performing at least a part of method 200 described above with respect to FIG. 2A. Thus, the determined pre-localized hostname may be associated with an edge server that is responsible for computing functionality associated with the initiation request provided by client computing device 302. In other examples, rather than service 304 communicating with pre-localization engine 306 in operations 316-324, such pre-localization aspects may instead be performed by service 304.

The determined pre-localized hostname is provided to service 304 at operation 322 and received by service 304 at operation 324. Accordingly, service 304 provides a response to the received initiation request at operation 326, wherein the response comprises the pre-localized hostname received from pre-localization engine 306. Thus, service 304 directs client computing device 302 to the pre-localized hostname associated with the CDN that was determined by pre-localization engine 306.

Client computing device 302 receives the response to the initiation request comprising the pre-localized hostname at operation 328, after which client computing device 302 requests content from the edge server indicated by the pre-localized hostname (e.g., edge server 308) at operation 330. In examples, operation 330 comprises issuing a DNS resolution request for the pre-localized hostname in order to obtain an IP address associated with edge server 308. For example, client computing device 302 may communicate with an intermediate DNS server (e.g., intermediate DNS server 108 in FIG. 1) or an authoritative DNS server (e.g., authoritative DNS server 110) to resolve the pre-localized hostname. In examples, the pre-localized hostname is localized as part of DNS resolution, where a proximate data center is identified and the pre-localized hostname is resolved to an IP address of an edge server therein. In other examples, the pre-localization response includes an IP address for the edge server 308.

Edge server 308 receives the request for content at operation 332 and provides the requested content accordingly at operation 334. In examples, edge server 308 has a copy of the requested content while, in other examples, edge server 308 may first access the requested content from another edge server or from an origin server, among other examples. Client computing device 302 receives the requested content from edge server 308 at operation 336. While method 300 is described as an example in which client computing device 302 is directed to edge server 308 by service 304 to access content, it will be appreciated that similar techniques may be used to direct client computing device 302 to edge server 308 for any of a variety of additional or alternative computing functionality and associated edge server responsibilities. Method 300 terminates at operation 336.

Figure 3B:
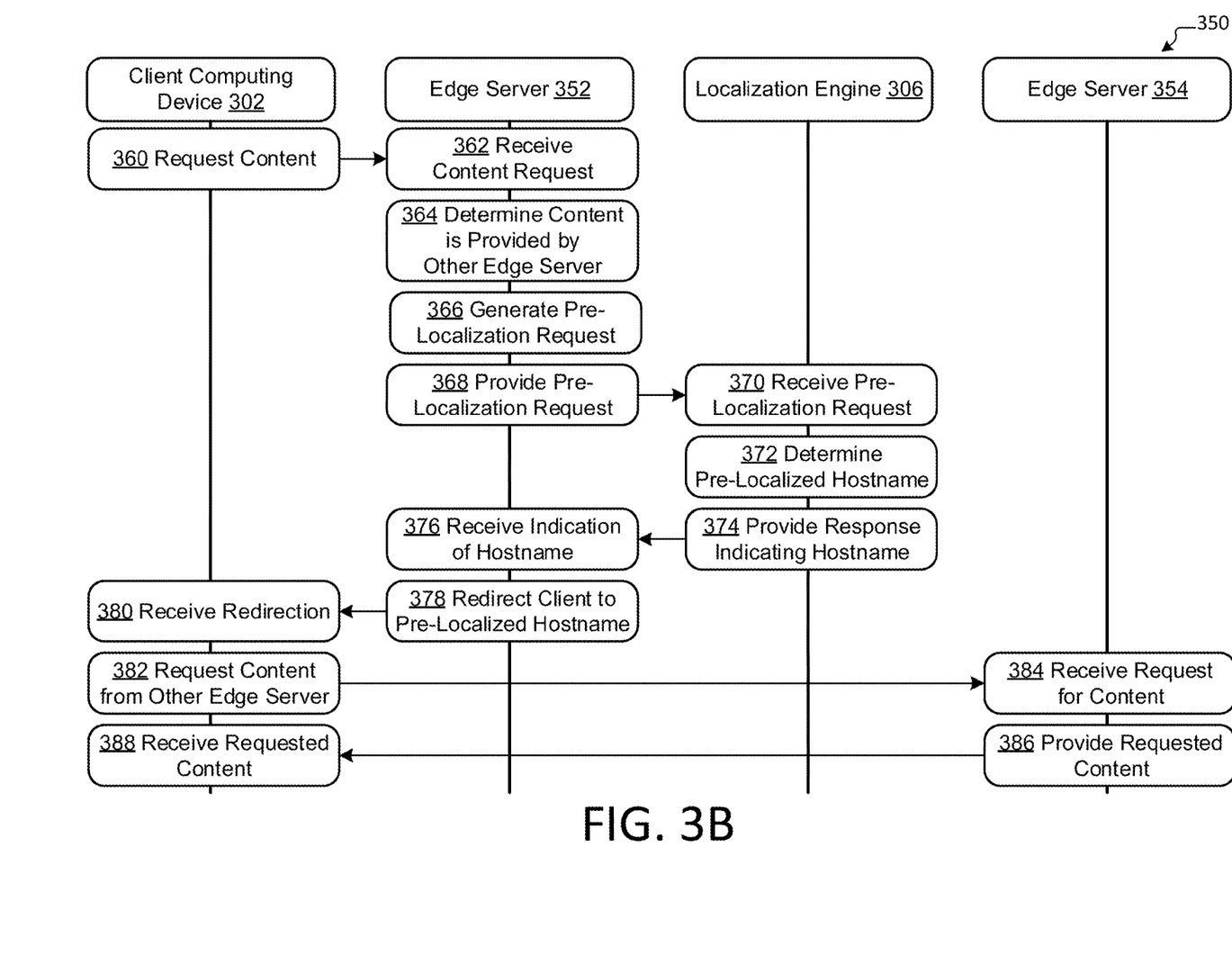
FIG. 3B illustrates an overview of an example method for performing hostname pre-localization at an edge server in order to direct a client computing device to a different edge server.

FIG. 3B illustrates an overview of an example method 350 for performing hostname pre-localization at an edge server in order to direct a client computing device to a different edge server. FIG. 3B comprises elements that were discussed above with respect to FIG. 3A and are therefore not necessarily re-described below in detail. FIG. 3B further comprises edge servers 352 and 354 (e.g., edge server 118 or 120 in FIG. 1) associated with a CDN. In examples, each of edge servers 352 and 354 is responsible for providing computing functionality of a CDN, such that one edge server may be better-suited to handle requests from a client computing device than the other edge server. As an example, edge server 354 may be responsible for content requested by client computing device 302, while edge server 352 may not be responsible for such content. Accordingly, fulfilling requests from client computing device 302 using edge server 352 may result in additional computational overhead and therefore cause inefficiencies within the CDN. Thus, method 350 directs client computing device 302 to edge server 354 instead of edge server 352.

Method 350 begins at operation 360, where client computing device 302 requests content from edge server 352. In examples, the content request is generated as a result of a service (e.g., service 104 in FIG. 1 or service 304 in FIG. 3) directing client computing device 302 to the CDN using a hostname (e.g., in response to an initiation request from client computing device 302). In examples, the hostname may be localized as part of the DNS resolution process as described herein, such that client computing device 302 receives and subsequently uses an IP address associated with edge server 352.

The content request is received by edge server 352 at operation 362 and, at operation 364, edge server 352 determines that the requested content is provided by another edge server. While method 350 is described as an example in which edge servers 352 and 354 provide content, it will be appreciated that similar techniques may be used for any of a variety of additional or alternative computing functionality and associated edge server responsibilities. In examples, edge server 352 determines that it should direct the content request to a different edge server rather than obtain the requested content itself and serve it to the client. Accordingly, edge server 352 generates a pre-localization request at operation 366, which is provided to pre-localization engine 306 at operation 368. As described herein, the pre-localization request comprises pre-localization information relating to the content request and/or client computing device 302.

Pre-localization engine 306 receives the pre-localization request at operation 370. In examples, the pre-localization request is received from edge server 352 via an API. Flow progresses to operation 372, where pre-localization engine 306 determines a pre-localized hostname (e.g., for edge server 354) based on the pre-localization information that was received at operation 370. Operation 372 may comprise performing at least a part of method 200 described above with respect to FIG. 2A. Thus, the determined pre-localized hostname may be associated with an edge server that is responsible for computing functionality associated with the content request provided by client computing device 302. In other examples, rather than edge server 352 communicating with pre-localization engine 306 in operations 366-376, such pre-localization aspects may instead be performed by edge server 352.

The determined pre-localized hostname is provided to edge server 352 at operation 374 and received by edge server 352 at operation 376. Accordingly, edge server 352 redirects client computing device 302 using the pre-localized hostname at operation 378. In examples, the redirect is provided to the client computing device as an HTTP 302 response or, as another example, the response comprises instructions that, when executed by client computing device 302, causes client computing device 302 to be directed to the pre-localized hostname. It will be appreciated that any of a variety of redirection techniques may be used.

Client computing device 302 receives the redirection instruction comprising the pre-localized hostname at operation 380, after which client computing device 302 requests content from edge server 354 at operation 382 using pre-localized hostname. In examples, operation 382 comprises issuing a DNS resolution request for the pre-localized hostname in order to obtain an IP address associated with edge server 354. For example, client computing device 302 may communicate with an intermediate DNS server (e.g., intermediate DNS server 108 in FIG. 1) or an authoritative DNS server (e.g., authoritative DNS server 110) to resolve the pre-localized hostname. In other examples, the redirection instruction includes an IP address for the edge server 354.

Edge server 354 receives the request for content at operation 384 and provides the requested content accordingly at operation 386. In examples, edge server 354 has a copy of the requested content while, in other examples, edge server 354 may first access the requested content from another edge server or from an origin server, among other examples. Client computing device 302 receives the requested content from edge server 354 at operation 388, after which method 350 terminates.

Figure 4:
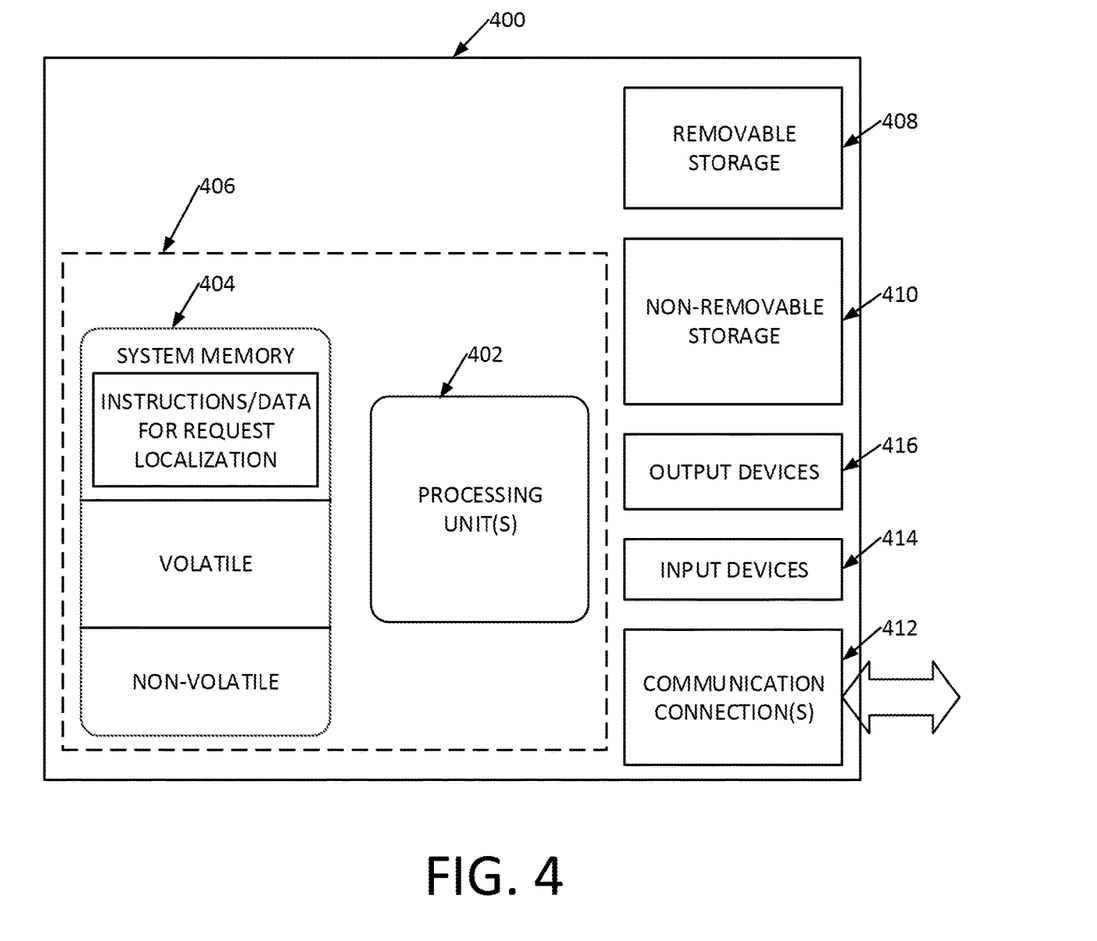
FIG. 4 illustrates an example of a suitable operating environment in which one or more of the present embodiments may be implemented.

FIG. 4 illustrates an example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically may include at least one processing unit 402 and memory 404. Depending on the exact configuration and type of computing device, memory 404 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as a keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. The computer readable media may be any available media that can be accessed by processing unit 402 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules (e.g., applications, Input/Output (I/O) management, and other utilities) may perform processes including, but not limited to, one or more of the stages of the operational methods described herein such as the methods illustrated in FIGS. 2A-2C and 3A-3B, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
   at least one processor; and
   memory, operatively connected to the at least one processor and storing instructions that, when executed by the at least one processor, cause the system to perform a set of operations, the set of operations comprising:
   receiving, at a content distribution network (CDN), a pre-localization request from a service that is distinct from the CDN and uses the CDN to deliver content provided by the service, wherein the pre-localization request comprises pre-localization information and the pre-localization information comprises an indication of particular content stored by the CDN;
   generating, based on the pre-localization information, a pre-localized hostname associated with an edge server of the CDN that is responsible for the particular content, wherein generating the pre-localized hostname comprises:
   generating a hash based on the particular content; and
   identifying the edge server according to a hashing algorithm;
   providing, in response to the pre-localization request, the pre-localized hostname for the edge server of the CDN;
   receiving, from a client computing device, a request for the content at the edge server of the CDN; and
   providing the content to the client computing device.

2. The system of claim 1, wherein:
the pre-localization information further comprises an indication of a geographic location for the client computing device; and
generating the pre-localized hostname comprises identifying a data center associated with the edge server based on the geographic location.

3. The system of claim 1, wherein generating the pre-localized hostname comprises:
evaluating a set of edge servers associated with the CDN to identify an edge server that is responsible for the particular content; and
generating the pre-localized hostname indicating the identified edge server.

4. The system of claim 1, wherein the pre-localized hostname is associated with at least the edge server of a first data center and a second edge server of a second data center.

5. The system of claim 1, wherein the particular content comprises video content, and wherein the service comprises a website that lists the video content for playback.

6. The system of claim 1, wherein the pre-localization information further comprises at least one of:
an IP address of the client computing device;
a geographic location of the client computing device;
one or more software of the client computing device;
one or more hardware capabilities of the client computing device;
a client computing device type; or
information relating to an initiation request.

7. A method for directing a client computing device to a content distribution network (CDN) using a pre-localized hostname, the method comprising:
receiving, at a service and from the client computing device, an initiation request relating to computing functionality provided by the CDN for the service, wherein the service is distinct from the CDN;
generating pre-localization information based at least in part on the initiation request and information about the client computing device;
determining, based on the pre-localization information, a pre-localized hostname associated with a particular edge server of the CDN, wherein the CDN includes a plurality of edge servers, and the particular edge server is responsible for the computing functionality, wherein determining the pre-localized hostname comprises:
generating a hash based on the particular content; and
identifying the particular edge server according to a hashing algorithm; and
sending to the client computing device, by the service, a response to the initiation request comprising the pre-localized hostname, thereby directing the client computing device to the particular edge server of the CDN.

8. The method of claim 7, wherein determining the pre-localized hostname comprises:
generating a pre-localization request comprising the pre-localization information;
providing the pre-localization request to a pre-localization engine of the CDN; and
receiving, in response to the pre-localization request, a response comprising the pre-localized hostname.

9. The method of claim 7, wherein determining the pre-localized hostname comprises evaluating a set of edge servers associated with the CDN to identify the particular edge server that is responsible for the computing functionality.

10. The method of claim 7, wherein the pre-localized hostname is associated with at least the particular edge server of a first data center and a second edge server of a second data center.

11. The method of claim 7, wherein the pre-localization information comprises at least one of:
an indication of the computing functionality;
an IP address of the client computing device;
a geographic location of the client computing device;
one or more software of the client computing device;
one or more hardware capabilities of the client computing device;
a client computing device type; or
information relating to the initiation request.

12. The method of claim 7, wherein the initiation request comprises the information about the client computing device.

13. A method for generating a pre-localized hostname, the method comprising:
receiving a pre-localization request comprising pre-localization information, wherein the pre-localization information comprises an indication of computing functionality associated with a content distribution network (CDN);
generating, based on the pre-localization information, a pre-localized hostname associated with an edge server of the CDN that is responsible for the computing functionality, wherein generating the pre-localized hostname comprises:
generating a hash based on the particular content; and
identifying the edge server according to a hashing algorithm; and
providing, in response to the pre-localization request, the pre-localized hostname to direct a client computing device to the edge server of the CDN.

14. The method of claim 13, wherein:
the pre-localization information further comprises an indication of a geographic location for the client computing device; and
generating the pre-localized hostname comprises identifying a data center associated with the edge server based on the geographic location.

15. The method of claim 13, wherein generating the pre-localized hostname comprises:
evaluating a set of edge servers associated with the CDN to identify an edge server that is responsible for the computing functionality; and
generating the pre-localized hostname indicating the identified edge server.

16. The method of claim 13, wherein the pre-localized hostname is associated with at least the edge server of a first data center and a second edge server of a second data center.

17. The method of claim 13, wherein the pre-localization request is received from a service associated with the CDN, and wherein the pre-localization information further comprises information relating to an initiation request of the client computing device.

18. The method of claim 13, wherein the pre-localization information further comprises at least one of:
an IP address of the client computing device;
a geographic location of the client computing device;
one or more software of the client computing device;
one or more hardware capabilities of the client computing device;
a client computing device type; or
information relating to an initiation request.

* * * * *